United States Patent [19]

Tu

[11] 4,215,015
[45] Jul. 29, 1980

[54] HIGH OCTANE FCC CATALYST

[75] Inventor: Hosheng Tu, Shorewood, Ill.

[73] Assignee: UOP Inc., Des Plaines, Ill.

[21] Appl. No.: 8,823

[22] Filed: Feb. 2, 1979

[51] Int. Cl.$^2$ .................... B01J 37/02; B01J 29/08
[52] U.S. Cl. .............................. 252/453; 252/455 Z
[58] Field of Search ........................... 252/453, 455 Z

[56] References Cited

U.S. PATENT DOCUMENTS

| | | | |
|---|---|---|---|
| 3,313,594 | 4/1967 | Wilson, Jr. et al. | 252/455 Z |
| 3,417,028 | 12/1968 | Montgomery et al. | 252/453 X |
| 3,592,778 | 7/1971 | Vesely | 252/451 |
| 4,061,717 | 12/1977 | Kerr et al. | 252/455 Z |
| 4,080,284 | 3/1978 | Mitchell | 252/455 Z |

*Primary Examiner*—Carl F. Dees
*Attorney, Agent, or Firm*—James R. Hoatson, Jr.; Louis A. Morris; William H. Page, II

[57] ABSTRACT

A catalyst composition and process for the utilization of said catalyst. The catalyst is a zeolitic crystalline aluminosilicate dispersed in an amorphous silica-alumina matrix. The catalyst is manufactured by adding a crystalline aluminosilicate to an alumina-silica gel containing an organic polymer and spray drying the gel at a temperature sufficient to decompose the polymer. The catalyst is particularly effective in the catalytic cracking of hydrocarbon charge stocks.

14 Claims, 1 Drawing Figure

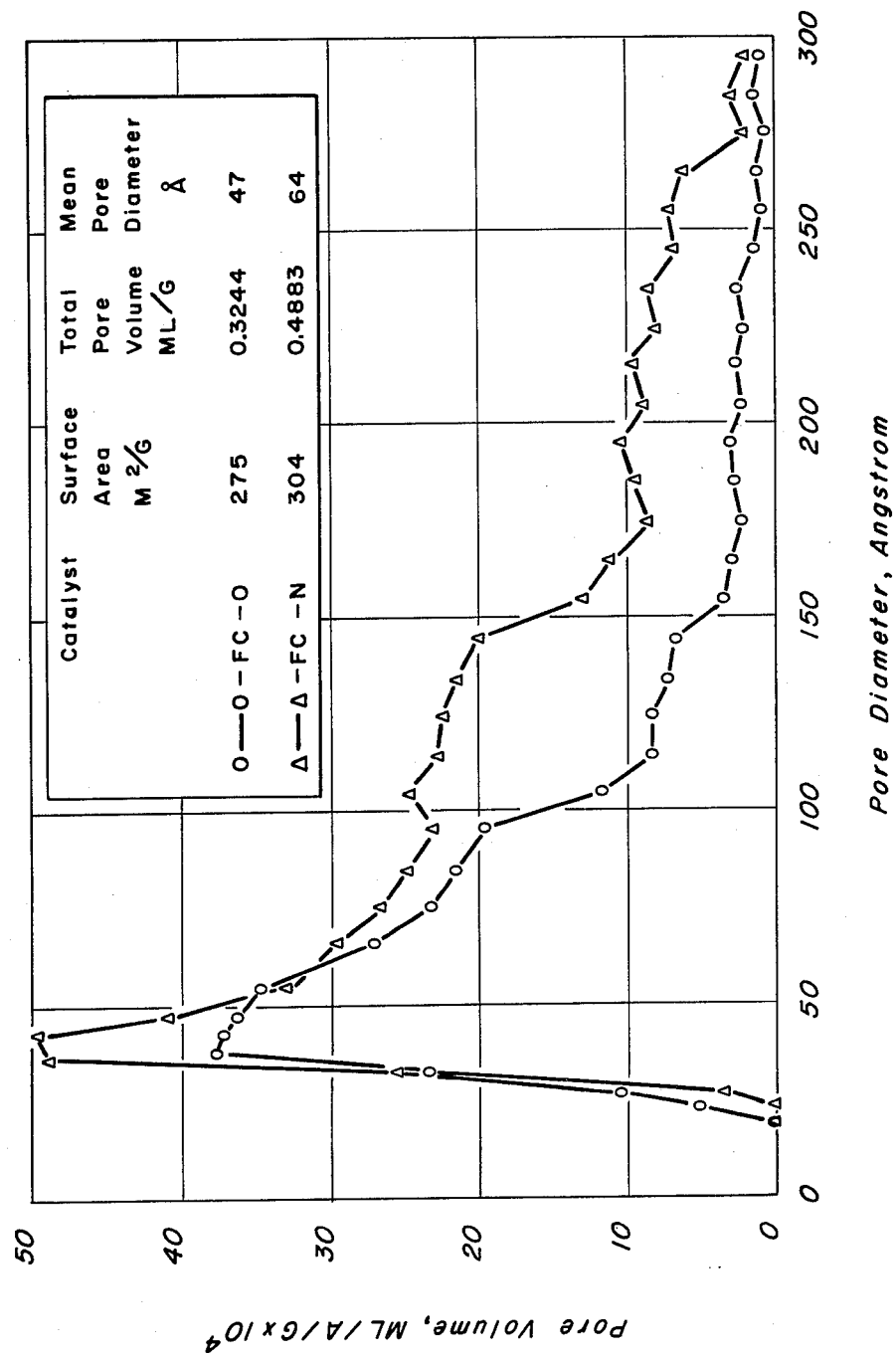

HIGH OCTANE FCC CATALYST

BACKGROUND OF THE INVENTION

1. Field of the Invention

The field of art to which the claimed invention pertains is catalytic composites. More specifically, the claimed invention relates to a catalytic composite comprising a zeolitic crystalline aluminosilicate dispersed in a silica-alumina matrix manufactured by spray drying a silica-alumina gel containing said zeolitic crystalline aluminosilicate and an organic polymer at a temperature sufficient to decompose the organic polymer.

2. Description of the Prior Art

The national move to remove lead from gasoline led to the investigation of high octane gasoline catalyst research. When and if refiners are required to market only unleaded gasoline, it will be necessary to upgrade the clear research octane numbers of many cat-cracked gasolines. FCC catalysts with the capability of high octane yields will help solve this problem.

For many years, heavy petroleum hydrocarbon feed stocks boiling in excess of about 400° F. have been converted to lower boiling hydrocarbons in the motor fuel boiling range by heating them at temperatures in the 600°–1000° F. range in contact with an amorphus silica-alumina catalyst. While other composites comprising silica, e.g., silica-zirconia silica-magnesia, etc., have been known to catalyze the cracking reaction, the silica-alumina composite has been by far the most widely accepted catalyst in the industry. More recently, improved catalysts having the capability of yielding greater proportions of high octane gasoline have been prepared by the inclusion of a finely divided zeolite, or crystalline aluminosilicate, either naturally occurring or synthetically prepared, within the amorphous silica-alumina matrix. Prior inventors have prepared, tested and compared hydrocarbon conversion catalysts comprising a finely divided crystalline aluminosilicate distributed in an amorphous silica matrix on the one hand, and in an amorphous silica-alumina matrix on the other hand. Examples of such catalysts are as described or claimed in U.S. Pat. Nos. 3,312,615; 3,392,110; 3,503,874; 3,592,778; 3,669,903; 3,696,023; 3,849,291; 3,926,778; 3,939,058; 4,001,106 and 4,100,219.

It is also known to the art to obtain a controlled pore size distribution in the amorphous matrix of a silica-alumina catalyst by incorporating an organic polymer in the gel which is the precursor of such matrix. Examples of methods for so controlling such distribution are as described or claimed in U.S. Pat. Nos. 3,332,494; 3,325,247; 3,361,526 and 3,417,028. These methods, however, enable the manufacture of alumina, silica or silica-alumina oxides having therein pore sizes lying predominantly in a range in excess of 500 Angstroms (Å) in diameter. I have discovered a catalytic composite comprising a zeolitic crystalline aluminosilicate dispersed in a silica-alumina matrix, characterized by its method of manufacture, which enables the creation of pore sizes in a medium range of from about 100 to about 275 Angstroms in diameter. I have also discovered that this catalytic composite is superior to known catalysts for use in the fluid catalytic cracking process from the standpoint of product yield distribution and exceptionally high octane in the gasoline product.

SUMMARY OF THE INVENTION

It is accordingly, a broad objective of my invention to obtain a novel catalytic composite in which a greater percentage of the pores have diameters in a range of from about 100 to about 300 Angstroms as compared to composites made by methods of the known art. Another objective is to provide a process for cracking a hydrocarbon charge stock in which said novel catalytic composite is used.

In brief summary, my invention is, in one embodiment, a catalytic composite comprising a zeolitic crystalline aluminosilicate dispersed in a silica-alumina matrix and manufactured by: (a) dispersing a zeolitic crystalline aluminosilicate in water to prepare a slurry; (b) preparing a gelation product by mixing together in an aqueous medium an inorganic aluminum salt, a water soluble organic polymer and an alkali-metal silicate; (c) adding said slurry to said gelation product to obtain a slurry gel; and (d) spray drying said slurry gel at a temperature sufficient to decompose said organic polymer.

In another embodiment, my invention is a process for cracking a hydrocarbon charge stock which comprises contacting said charge stocks with the catalytic composite of the above first-mentioned embodiment at cracking conditions.

Other objectives and embodiments of my invention encompass details about composite ingredients, steps in the manufacture and chemicals and conditions used in such manufacture all of which are hereinafter disclosed in the following discussion of each of the facets of my invention.

DESCRIPTION OF THE INVENTION

Pursuant to the present method of catalyst preparation, the first step is the dispersion of a zeolitic crystalline aluminosilicate in water so as to obtain a slurry. It is preferred that the pH of this slurry be adjusted from about 4.0 to about 5.0 by the addition of a buffer solution such as an aqueous solution of sodium acetate and acetic acid.

Zeolitic crystalline aluminosilicates which may be used in the present invention occur both naturally or are synthesized. In hydrated form, the crystalline aluminosilicates generally encompass those zeolites represented by the Formula 1 below:

Formula 1

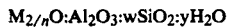

where "M" is a cation which balances the electrovalence of the aluminum-centered tetrahedra and which is generally referred to as an exchangeable cationic site, "n" represents the valence of the cation, "w" represents the moles of $SiO_2$, and "y" represents the moles of water. The generalized cation "M" may be monovalent, divalent or trivalent or mixtures thereof.

Crystalline aluminosilicates particularly useful in the present invention comprise zeolites in either the X or Y form. The X zeolite in the hydrated or partially hydrated form can be represented in terms of mole oxides as shown in Formula 2 below:

Formula 2

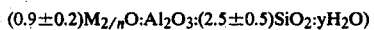

where "M" represents at least one cation having a valence of not more than 3, "n" represents the valence of "M", and "y" is a value up to about 9 depending upon the identity of "M" and the degree of hydration of the crystal. As noted from Formula 2 the $SiO_2/Al_2O_3$ mole ratio of X zeolite is 2.5±0.5. The cation "M" may be one or more of a number of cations such as a hydrogen cation, an alkali metal cation, or an alkaline earth cation, or other selected cations, and is generally referred to as an exchangeable cationic site. As the X zeolite is initially prepared, the cation "M" is usually predominately sodium, that is, the major cation at the exchangeable cationic sites is sodium, and the zeolite is therefore referred to as a sodium-X zeolite. Depending upon the purity of the reactants used to make the zeolite, other cations mentioned above may be present, however, as impurities. The Y zeolite in the hydrated or partially hydrated form can be similarly represented in terms of mole oxides as in Formula 3 below:

Formula 3

$$(0.9\pm 0.2)M_{2/n}O:Al_2O_3:wSiO_2:yH_2O$$

where "M" is at least one cation having a valence not more than 3, "n" represents the valence of "M", "w" is a value greater than about 3 up to about 6, and "y" is a value up to about 9 depending upon the identity of "M" and the degree of hydration of the crystal. The $SiO_2/Al_2O_3$ mole ratio for Y zeolites can thus be from about 3 to about 6. Like the X zeolite, the cation "M" may be one or more of a variety of cations but, as the Y zeolite is initially prepared, the cation "M" is also usually predominately sodium. A Y zeolite containing predominately sodium cations at the exchangeable cationic sites is therefore referred to as a sodium-Y zeolite.

The second step in the method of the present invention is the preparation of the gelation product, which comprises a mixture in an aqueous medium of an inorganic aluminum salt, a water soluble organic polymer and an alkali-metal silicate. It is preferred that the components of this mixture be first prepared in separate aqueous solutions. It is further preferred that the inorganic aluminum salt comprise aluminum sulfate, an aluminum halide, or aluminum nitrate, and that the alkali metal silicate comprise sodium silicate. It is particularly preferred that the water soluble organic polymer comprise an anionic polyacrylamide, since it is believed that the anionic form chemically reacts with the silica-alumina gel framework, rather than merely being physically dispersed in the gel, and thus contributes to the desired pore structure formation.

The mixing of the components of the gelation product is preferably effected by the steps of: (1) adding the solution of organic polymer to the solution of alkali metal silicate to obtain mixture A; (2) adding a dilute solution of mineral acid to the solution of inorganic aluminum salt to obtain mixture B; (3) adding mixture A to mixture B over an extended period of time to obtain mixture C; and (4) adding a buffer solution to mixture C and then raising the pH thereof to about 3.5, thus obtaining the gelation product. It is particularly preferred that the temperature of the above mixtures B and C and the gelation product be maintained at from about 95° F. to about 100° F., that the buffer solution added to mixture C comprise an aqueous solution of sodium acetate and acetic acid, the raising of the pH of mixture C be effected by the addition of aqueous ammonia solution, and that the amount of organic polymer in the organic polymer solution be such that the organic polymer comprises from 2 to 10 weight percent of the gelation product plus crystalline aluminosilicate on a dry basis.

The third step in the method of the present invention is to add the zeolitic crystalline aluminosilicate slurry to the gelation product to obtain a slurry gel. It is preferred that the slurry gel, prior to being spray dried, be further treated by adjusting the temperature of the slurry gel to from about 95° F. to about 100° F., aging the slurry gel, raising the pH of the slurry gel to above 5 and again aging the slurry gel. It is particularly preferred that the first aging be for about 30 minutes, that the pH be raised by the addition of aqueous ammonia solution and that the subsequent aging be for a period of about 3 hours.

The fourth step in the method of the present invention is to spray dry the slurry gel at a temperature sufficient to decompose the organic polymer. In principle, the spray dryer works by pumping the solution or slurry to be dried under high pressure to a pressure jet spray nozzle in which it is mixed with hot air under conditions of high turbulence and sprayed into a chamber. In the chamber the liquid is evaporated from the solution or slurry and the dried solids are collected.

The dried solids are preferably washed in a washing solution, such as an aqueous solution of ammonium nitrate and ammonia, to remove extraneous materials which tend to clog the pores of the dried solids following spray drying. After washing, the catalyst composite obtained will have from about 15% to about 40% of its pore volume in the particularly preferred 100 to 150 Angstrom pore diameter range and up to about 30% of its pore volume in the next preferred 150 to 275 Angstrom pore diameter range.

Cations occupying the exchangeable cationic sites in the zeolite of the catalyst composite of the present invention may, subsequent to spray drying, be replaced with other cations by ion exchange methods well known to those having ordinary skill in the field of crystalline alumino-silicates. Such methods are generally performed by contacting the zeolite or a base material containing the zeolite with an aqueous solution of the soluble salt of the cation or cations desired to be placed upon the zeolite. After the desired degree of exchange takes place the sieves are removed from the aqueous solution, washed, and dried to a desired water content. By such methods the sodium cations and any non-sodium cations which might be occupying exchangeable sites as impurities in a sodium-X or sodium-Y zeolite can be partially or essentially completely replaced with other cations. It is preferred that the catalyst composite of the present invention be cation exchanged with cations selected from the group consisting of the rare earth elements of the Periodic Table of the Elements.

The catalyst composite of the present invention is intended to be used in a process for cracking a hydrocarbon charge stock at cracking conditions. The most common form of such a process is well known to the art as the fluid catalytic cracking process and is described in detail in numerous publications, such as U.S. Pat. Nos. 2,409,353; 2,692,864; and 2,698,281; to name just a few of the most basic of these publications.

The following examples are presented to illustrate the method of manufacture of the catalytic composite of the present invention as well as its subsequent use in a fluid catalytic cracking process, and are not intended to unduly restrict the scope and spirit of the claims attached hereto.

EXAMPLE I

In the manufacture of the catalyst composite according to the method of the present invention, a slurry gel was prepared as follows:

1. 726 grams of Magnifloc 870A (an anionic polyacrylamide) made by American Cyanamid Co. were dissolved in 30 lbs. of deionized water (component A).
2. 2358 grams of Na-Y zeolite were dispersed in 19 lbs. of deionized water (component B).
3. Buffer solution (sodium acetate +acetic acid) was added to component B bringing the solution pH to around 4.0–5.0 (component C).
4. 31 lbs. of aluminum sulfate was added in five increments into a solution tank which contained 41 lbs. of deionized water. Aluminum sulfate was completely dissolved in each addition. The solution was mixed for 30 minutes (component D).
5. 115 lbs. of deionized water was weighed into a Lightning tank.
6. 43 lbs. of water glass (sodium silicate) was added into the Lightning tank over a period of 10 minutes and mixing was initiated.
7. Component A (Magnifloc 870A solution) was added to the water glass solution in the Lightning tank over a period of 5 minutes and the solution was mixed for 15 minutes (component E).
8. 23 lbs. of 25 wt. % sulfuric acid was added into a Chemineer tank with the temperature in the tank controlled between 95° F. and 100° F. by steam tracing around the tank.
9. Component D(aluminum sulfate) was added into the Chemineer tank over a period of 15 minutes with constant mixing.
10. The water glass solution (component E) was pumped very slowly into the vortex of the solution in the Chemineer tank over a period of 1½ hours with continuous mixing.
11. Buffer solution (sodium acetate +acetic acid) was added to the Chemineer tank and ammonia solution slowly added until the pH in the Chemineer tank was raised to 3.5.
12. Zeolite slurry (component C) was slowly added into the Chemineer tank over a period of 10 minutes. The mixture was aged for 30 minutes with its temperature maintained between 95° F. and 100° F.
13. The pH of the mixture in the Chemineer tank was raised to 8 by adding 15 wt. % ammonia and then aged for 3 hours to obtain the slurry gel.

The slurry gel was then spray dried. The spray dryer utilized comprised a high pressure slurry pump, a source of hot air, a pressure-jet spray nozzle, a drying chamber, a product collection drum and high efficiency cyclone fines collecting means. The slurry gel was pumped via the slurry pump at a pressure of 800 psig. to the pressure-jet spray nozzle where it was mixed with air having a temperature of 1000° F. and sprayed downward into the drying chamber. In the pressure-jet spray nozzle the slurry gel was introduced at the 800 psig. pressure through two 0.032 inch diameter ports tangentially into a circular swirl chamber incorporated in the nozzle which mixed the hot air with the slurry gel and imparted a high tangential velocity to the mixture. The swirling slurry gel-air mixture then passed out of the nozle into the drying chamber via a 0.035 inch nozzle and a spray cone having the nozzle at its apex.

From the drying chamber, the evaporated water, air and fine solids passed through a cyclone collector for fines-air separation, with the air thereafter vented to the atmosphere. The dried catalytic composite formed in the drying chamber flowed downward into a product drum at the base of the chamber.

The catalytic composite was then washed with a washing solution comprising a mixture of 11 lbs. of ammonium nitrate, 3.0 lbs. of 15 wt. % ammonia solution and 41.5 lbs. of deionized water. The catalytic composite was slurried with this solution for 15 minutes and then filtered. The washing procedure was repeated three additional times.

The washed catalytic composite was then cation exchanged with rare earth cations predominately comprising lanthanum. The ion exchange solution was prepared by dissolving 167 grams of lanthanum-rich rare earth chloride in 63 lbs. of deionized water. The catalytic composite was mixed with the solution for 60 minutes and then washed with deionized water.

The ion exchanged catalytic composite was dried at 350° F. for two hours. The finished catalytic composite is hereinafter referred to as "FC-N".

Following is a comparison of the composition and physical properties of FC-N with that of a commercially available fluid catalytic cracking catalyst not prepared by the method of the present invention, hereinafter referred to as "FC-O":

|  | FC-N | FC-O |
| --- | --- | --- |
| % Volatile | 15.7 | 14.3 |
| Wt. % Na$_2$O VF (volatile free) | 0.45 | 0.82 |
| Wt. % S | 0.02 | — |
| Wt. % SiO$_2$ VF | 65.5 | 65.3 |
| Wt. % Al$_2$O$_3$ VF | 30.5 | 28.8 |
| ABD (apparent bulk density), g/ml | 0.41 | 0.57 |
| Wt. % Rare Earth |  |  |
| Nd | 0.78 | 0.67 |
| Pr | 0.30 | 0.24 |
| Ce | 0.41 | 0.62 |
| La | 1.62 | 0.76 |
| Attrition Resistance (abrasion test) |  |  |
| Fines produced @ 12 hrs., wt. % | 32.8 | 37.9 |
| 12–42 hrs., wt. %/hr. | 0.37 | 0.69 |
| Particle size distribution, wt. % |  |  |
| 0–20 microns | 3.6 | 6.6 |
| 20–40 | 29 | 14.5 |
| 40–60 | 33.3 | 17.5 |
| 60–80 | 17.5 | 20.3 |
| 80–105 | 7.4 | 24.5 |
| 105–149 | 3.8 | 14.2 |

A further comparison between FC-O and FC-N is given in the attached FIGURE which graphically presents a comparison between the catalytic composites, with regard to the total volume of pores of specific sizes in each composite in terms of milliliters per Angstrom per gram of composite.

The effect of the method of the present invention is apparent from the above data and attached FIGURE. Such method has created increased pore volume largely in the medium pore diameter range of from about 100 to 150 Angstroms and somewhat in the pore diameter range of 150 to 275 Angstroms. Specifically, 22.8% of the pore volume of the FC-N was in the 100–150 Angstrom range and 21.9% in the 150–275 Angstrom range as compared to 12.0% and 8.6% of the pore volume of the FC-O, respectively, for the same ranges of pore diameter. it is also important to note that the catalytic composite of the present invention achieves superior attrition resistance over that of the known art.

EXAMPLE II

A portion of the catalytic composite manufactured during the procedure described in Example I hereof (FC-N) was evaluated by its utilization in a fluid catalytic cracking pilot plant of design similar in principle to that hereinbefore discussed. Also evaluated in that pilot plant was the conventional catalytic composite (FC-O). The feedstock used for both evaluations was a vacuum gas oil having an initial boiling point of 430° F. Following are the performance results of both evaluations:

|  | FC-O | FC-N |
|---|---|---|
| Operating Conditions |  |  |
| Process time, min. | 0.62 | 0.62 |
| WHSV, hr.$^{-1}$ | 32.3 | 32.3 |
| C/O per cycle | 2.99 | 3.00 |
| Reactor temp., °F. | 949 | 952 |
| Reactor pressure psig | 23 | 13 |
| Conversion, vol. % | 70.7 | 68.7 |
| Product distribution, wt. % |  |  |
| $C_3$- | 4.2 | 5.2 |
| Total $C_4$ | 7.4 | 8.3 |
| Total $C_5$ | 8.8 | 8.4 |
| $C_6$-EP Gasoline | 44.2 | 40.3 |
| Cycle oil | 31.6 | 34.1 |
| Coke | 3.8 | 3.7 |
| Octane, Research |  |  |
| Clear | 80.4 | 88.4 |
| + 3 cc TEL | 92.7 | 96.3 |
| Olefin yields |  |  |
| $C_3=$ /Total $C_3$ | 74.5 | 81.7 |
| $C_4=$ /Total $C_4$ | 37.1 | 55.5 |
| $C_5=$ /Total $C_5$ | 39.5 | 50.8 |

The above results clearly show the superior performance of FC-N.FC-N achieves exceptionally high octane product as compared to FC-O. Increased olefin yields are also advantageous as they enable higher unleaded research octane numbers of the gasoline.

I claim as my invention:

1. A catalytic composite comprising a zeolitic crystalline aluminosilicate dispersed in a silica-alumina matrix and having pore sizes in the intermediate range of about 100 to about 275 Angstroms in diameter, said composite having been manufactured by:
   (a) dispersing a zeolitic crystalline aluminosilicate in water to prepare a slurry;
   (b) preparing a gelation product by mixing together in an aqueous medium an inorganic aluminum salt, a water soluble anionic polyacrylamide and an alkali-metal silicate;
   (c) adding said slurry to said gelation product to obtain a slurry gel; and
   (d) spray drying said slurry gel at a temperature sufficient to decompose said organic polymer.

2. The catalytic composite of claim 1 further characterized with respect to step (a) in that said zeolitic crystalline aluminosilicte comprises Na-Y faujasite.

3. The catalyst composite of claim 1 further characterized with respect to step (b) in that the anion of said inorganic aluminum salt be selected from the group consisting of the sulfate ion, the halide ions and the nitrate ion.

4. The catalyst composite of claim 1 further characterized with respect to step (b) in that said alkali metal silicate comprises sodium silicate.

5. The catalyst composite of claim 1 further characterized with respect to step (a) in that a buffer solution is added to said slurry so as to adjust the pH of said slurry from about 4.0 to about 5.0.

6. The catalyst composite of claim 5 further characterized in that said buffer solution comprises an aqueous solution of sodium acetate and acetic acid.

7. The catalyst composite of claim 5 further characterized with respect to step (b) in that prior to said mixing, said inorganic aluminum salt, said water soluble anionic polyacrylamide and said alkali metal silicate are prepared in separate aqueous solutions.

8. The catalyst composite of claim 7 further characterized with respect to step (b) in that said mixing is effected by:
   (1) adding said solution of anionic polyacrylamide to said solution of alkali metal silicate to obtain mixture A;
   (2) adding said solution of inorganic aluminum salt to a dilute solution of mineral acid to obtain mixture B;
   (3) adding said mixture A to said mixture B over an extended period of time to obtain mixture C; and
   (4) adding a buffer solution to said mixture C and thereafter raising the pH of said mixture C to about 3.5 to obtain said gelation product.

9. The catalyst composite of claim 8 further characterized in that the temperature of said mixtures B and C and of said gelation product are maintained at from about 95° F. to about 100° F.

10. The catalyst composite of claim 9 further characterized in that said buffer solution added to said mixture C comprises an aqueous solution of sodium acetate and acetic acid and said raising of the pH of said mixture C is effected by the addition of aqueous ammonia solution.

11. The catalyst composite of claim 9 further characterized in that said anionic polyacrylamide comprises from 2 to 10 weight percent of said slurry gel on a dry basis.

12. The catalyst composite of claim 11 further characterized in that the temperature of said slurry gel is maintained at from about 95° F. to about 100° F., that said slurry gel is aged, that the pH of said slurry gel is raised to above 5 and that said slurry gel is thereafter again aged.

13. The catalyst composite of claim 12 further characterized in that the first aging of said slurry gel is for about 30 minutes, that said pH is raised by the addition of aqueous ammonia solution and that the subsequent aging is for a period of about 3 hours.

14. The catalyst composite of claim 12 further characterized in that subsequent to spray drying said slurry gel cations at exchangeable cationic sites in said zeolitic crystalline aluminosilicate are exchanged with one or more cations selected from the group consisting of the rare earth elements of the Periodic Table of the Elements.

* * * * *